Figure 1:
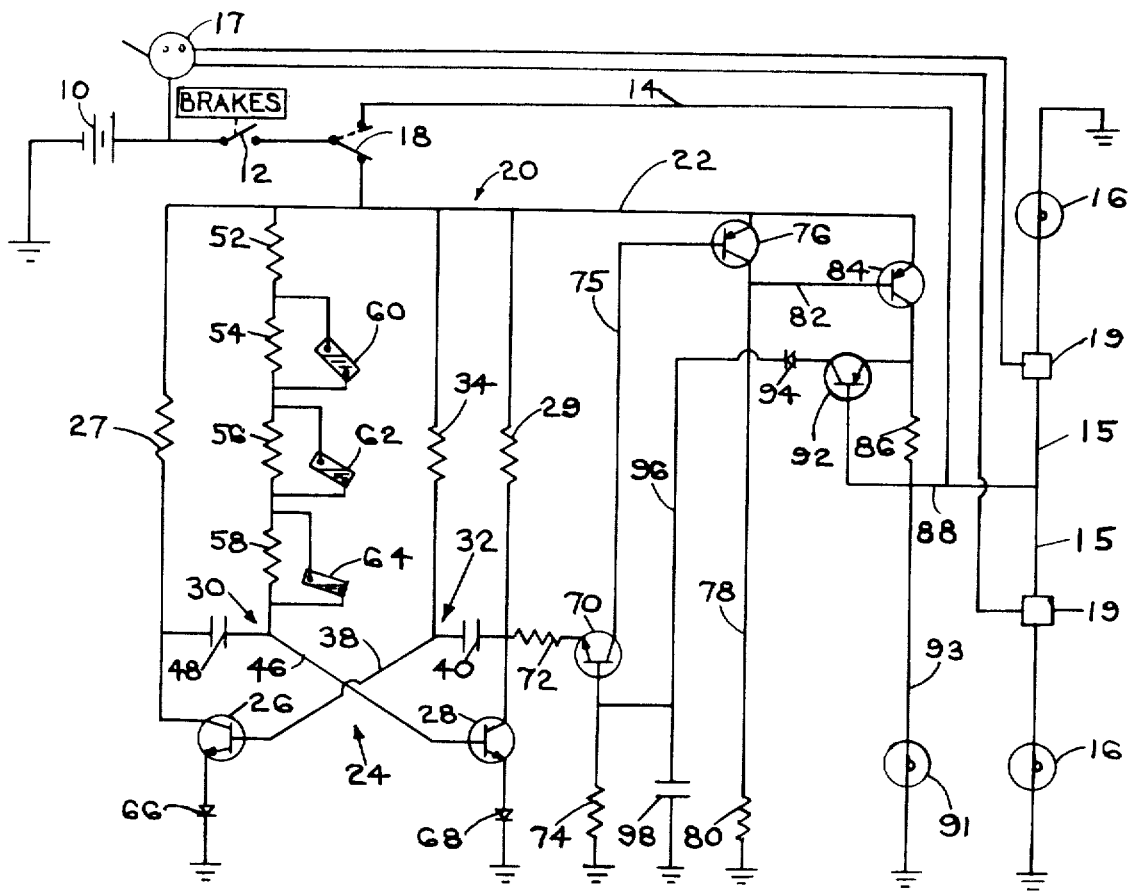

United States Patent

[11] 3,593,278

| [72] | Inventors | Frank D. Bower<br>1042 Springhouse Road, Allentown, Pa. 18104;<br>Gordon B. Baumeister, 417 Margo Lane, Berwyn, Pa. 19312 |
|---|---|---|
| [21] | Appl. No. | 733,101 |
| [22] | Filed | May 29, 1968 |
| [45] | Patented | July 13, 1971 |

[54] VEHICLE BRAKE LIGHT SYSTEM
6 Claims, 2 Drawing Figs.

[52] U.S. Cl. .................................................. 340/72,
307/271, 331/113, 340/67, 340/251
[51] Int. Cl. .................................................. B60q 1/44
[50] Field of Search .................................................. 73/510,
517; 200/61.45, 61.47—61.51, 61.53; 331/113;
340/66, 67, 72, 81, 71, 262

[56] References Cited
UNITED STATES PATENTS

| 1,791,164 | 2/1931 | Froesch | 200/61.47 X |
| 1,851,498 | 3/1932 | Doane | 340/262 |
| 1,921,833 | 8/1933 | McGorum | 340/262 |
| 2,988,737 | 6/1961 | Schroeder | 73/517 (R) X |
| 3,188,623 | 6/1965 | Culbertson | 340/81 X |
| 3,258,746 | 6/1966 | Bumpous | 340/71 |
| 3,343,100 | 9/1967 | Medina | 331/113 X |
| 3,358,194 | 12/1967 | Wintriss | 200/61.53 X |
| 3,370,181 | 2/1968 | Sitomer | 307/242 |
| 3,431,556 | 3/1969 | Johnson | 340/72 |
| 3,382,405 | 5/1968 | Johnson | 340/331 X |

*Primary Examiner*—John W. Caldwell
*Assistant Examiner*—Kenneth N. Leimer
*Attorney*—Ronald B. Sherer ABSTRACT: A vehicle brake light system is disclosed wherein a flashing signal of variable frequency indicates the rate of deceleration of a vehicle. The system includes a series of inertia switches and resistors forming a decelerometer, a multivibrator and a transistorized gate circuit which flashes the brake lights at a frequency proportional to the detected rate of deceleration.

INVENTORS
GORDON B. BAUMEISTER
BY FRANK D. BOWER

VEHICLE BRAKE LIGHT SYSTEM

BACKGROUND OF THE INVENTION

For many years, it has been a widely known fact that many serious accidents, particularly on today's high-speed highways, are caused by the deceleration of a lead vehicle which is incorrectly judged by the driver of a trailing vehicle such that a rear end collision or other serious accident results. Prior attempts to solve this serious problem have suggested multiple light systems wherein various color lights or a number of lights in a series are provided to indicate the rate at which a lead vehicle is decelerating. Unfortunately, however, such factors as mechanical unreliability and high cost have prevented such multiple light systems from being widely adopted.

SUMMARY OF THE INVENTION

The present invention departs from the complex, multiple light concepts of the prior systems and provides a low-cost, highly reliable, solid state electronic system for detecting variable rates of deceleration and flashing the standard, conventional brake lights of the vehicle at a frequency which is directly proportional to the rate of deceleration of the vehicle. This electronic system, which is easily installed on existing vehicles or incorporated in new vehicles, essentially comprises a transistorized multivibrator which opens and closes a transistor gate circuit through which current is supplied to the standard brake lights. In order to operate the multivibrator at various frequencies proportional to various deceleration rates of the vehicle, one leg of the multivibrator is provided with a series of inertia switches and resistors which collectively constitute a variable-rate decelerometer.

Figure 2:
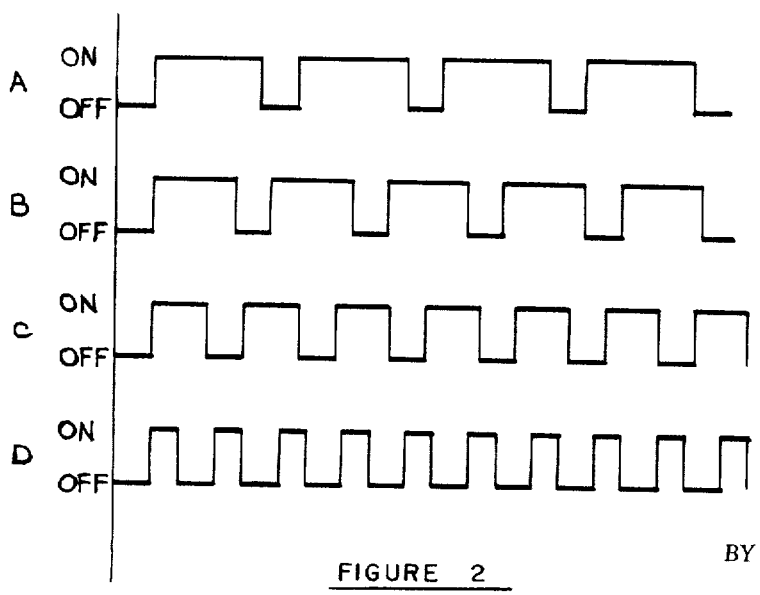

Thus, the decelerometer detects the rate of deceleration and causes the flashing rate of the brake lights to vary in response thereto as will be more fully described with reference to the accompanying drawings wherein:

FIG. 1 is a schematic circuit diagram of the electronic system connected to a standard brake light system of a vehicle; and FIG. 2 shows several frequency curves illustrating representative "ON" and "OFF" periods of the brake lights for four different rates of deceleration, the duration of the OFF periods being constant and the duration of the ON periods being proportional to deceleration.

Referring first to FIG. 1, numeral 10 indicates the battery of a vehicle which is normally connected through a switch 12 actuated by the standard brake system and lines 14, 15 to the conventional brake lights 16 of the vehicle; the battery and brake lights normally having one side grounded to the vehicle body. It will also be noted that the turn signal system is schematically shown as comprising a manual control 17 and a pair of switches 19 whereby the same lights may be used to indicate turning of the vehicle, as will be more fully described hereinafter.

In order to incorporate the electronic system 20 of the present invention into such a conventional brake light system, a manually operated, two-position safety switch 18 is added to line 14 such that, with the safety switch in the dotted position, the brake light system can be operated in the conventional manner. That is, when the brakes are applied, switch 12 is closed and the brake lights are illuminated with a steady current. However, in the normal use of the present invention, switch 18 is placed in the solid line position such that closure of switch 12 connects the battery to line 22 which forms the positive side of the complete electronic system 20.

As previously mentioned, system 20 includes a multivibrator network 24 which includes a pair of transistors 26, 28 having their collectors connected to resistors 27, 29 and their bases connected to resistance-capacitance networks 32 and 30, respectively. Referring first to RC network 32, the time constant of this circuit is determined by the value of capacitor 40 and resistor 34 connected to the base of transistor 26 by line 38. Similarly, in RC network 30, the time constant is determined by the value of capacitor 48 and the total resistance of a series of resistors 52, 54, 56, and 58 which are connected to the base of transistor 28 by line 46. The latter three resistors are provided with individual bypass circuits including inertia-responsive, mercury switches 60, 62, and 64. It is to be understood that each of switches 60, 62, and 64 may be a conventional mercury switch having internal contacts adapted to be bridged by a conductive fluid such as mercury. However, in accordance with the present invention, the three switches are physically positioned in the system such that each has a different orientation or slope. Thus, the conductive fluids must move upwardly along differently inclined paths in order to bridge their respective contacts. In addition, it is to be understood that the lower ends of the switches face toward the rear of the vehicle such that the switches are forwardly inclined. Therefore, upon deceleration of the vehicle, the conductive fluid in each switch tends to flow up the incline toward the electrode bridging position, in which condition the closed switch establishes a bypass around its respective resistor.

From the foregoing description, it will be apparent that the series of resistors 54, 56, and 58, together with their respective inertia switches 60, 62, and 64, comprise a variable-rate decelerometer wherein the individual resistors are progressively bypassed as a function of the deceleration rate acting upon the fluids having differently inclined paths. The switches are arranged such that a very low rate of deceleration will be insufficient to cause any of the switches to close such that no resistors will be bypassed. However, a first higher rate of deceleration will cause switch 64 to close thereby bypassing resistor 58. A second higher rate of deceleration will cause both switches 64 and 62 to close thereby bypassing resistors 58 and 56. Similarly, a third higher rate of deceleration will cause all three switches to close thereby bypassing all three resistors. Of course, it will be readily apparent that any number of resistor-switch pairs may be provided depending upon how many different rates of deceleration are desired to be detected, four rates being selected only for purposes of example. It will also be readily apparent that the variable-rate decelerometer may comprise a series of capacitors or other impedances in place of the illustrated resistors 54, 56, and 58.

Referring back to transistors 26 and 28, both emitters are connected to ground through respective diodes 66, 68 while their bases are cross-connected to the RC networks just described and their collectors are connected to resistors 27 and 29 as previously described. Thus, the combined circuitry comprises a multivibrator having the characteristic flip-flop operation; i.e., the two networks alternately charge and discharge at a frequency determined by the RC time constant of the networks.

Referring now to the central portion of the circuit 20, the emitter of a control transistor 70 is connected through a resistor 72 to the collector of transistor 28. The base of control transistor 70 is connected to ground through a resistor 74 and a capacitor 98 which form an RC network. The collector of control transistor 70 is connected to the base of a driver transistor 76. The emitter of driver transistor 76 is connected to positive line 22 and the collector is connected to ground through line 78 and resistor 80. The collector of transistor 76 is also connected through line 82 to the base of power transistor 84. The emitter of power transistor 84 is connected to positive line 22 while the collector is connected through a small resistor 86 and lines 88, 15 to the brake lights 16. Thus, power transistor 84 functions as a gate or switching circuit through which power or illuminating current is supplied to the brake lights.

In order to indicate the operating condition of the brake lights, the preferred embodiment of the invention includes a pilot light 91 mounted on the instrument panel and connected through line 93 to line 88 so as to be in parallel with the brake lights.

For reasons which will subsequently become apparent in the description of operation, the preferred embodiment further includes a sensing transistor 92 having its base and emitter connected across resistor 86. The collector of sensing transistor 92 is connected through a diode 94 and line 96 to the biasing RC network comprising resistor 74 and capacitor 98 which controls transistor 70.

The operation of the output portion of circuit 20 just described is as follows. Upon closure of brake switch 12, current flows through switch 18 and line 22 to the emitters of driver transistor 76 and power transistor 84. Power transistor 84 is normally in a saturated "ON" condition due to the current path provided through its emitter and base, lines 82, 78 and resistor 80 to ground. Thus, power current can flow from line 22, through power transistor 84, resistance 86 and lines 88, 15 to the brake lights except when driver transistor 76 shunts sufficient current through itself to reduce the base drive of power transistor 84 such that the latter becomes nonconductive. In turn, driver transistor 76 is conductive or nonconductive dependent upon the current flow applied to its base through line 75, control transistor 70 and resistor 72 from the collector of multivibrator transistor 28. Thus, the time periods during which the brake lights are illuminated; i.e., their ON periods, are dependent upon the resistance-capacitance value of network 30 which controls the discharge of transistor 28. On the other hand, the "OFF" periods are determined by the constant resistance-capacitance of network 32. Thus, as shown in FIG. 2, the OFF periods are always of constant duration but the ON periods vary as a function of the deceleration rate sensed by inertia switches. As a result, the operator of a trailing vehicle is presented with a visual image of the rate at which the vehicle in front of him is decelerating. For example, if the vehicle in front is coasting or decelerating at a rate in the order of 0 to 4 ft./sec.$^2$, none of inertia switches 60, 62 or 64 close and the signal appears as a series of relatively long duration periods of illumination, separated by short OFF periods as shown in FIG. 2 by frequency curve A. Thus, the low frequency of the flashing indicates a low deceleration rate which is not cause for alarm. At the opposite extreme, however, a deceleration rate at or above 20 ft.sec.$^2$ results in closure of all of the inertia switches and this results in series of flashes wherein the ON periods are approximately equal to the OFF periods as shown in FIG. 2 by frequency curve D. Thus, it will be apparent that the high frequency flashing gives the operator of the trailing vehicle a strong visual image of the dangerously high rate of deceleration whereby he can immediately react to avoid a potentially serious accident. Of course, any number of various intermediate rates of deceleration can be indicated in the same manner depending upon the number of slope of inertia switches which are incorporated, such intermediate rates being illustrated by frequency curves B and C. Also, it is to be understood that, although frequency curves A and D are illustrated has having a 4 to 1 ratio between the durations of the ON periods, in practice this ratio may be substantially higher; i.e., it will be as high as 15 to 1.

In the foregoing description, no mention has been made of the turn signal system and, actually, most safety engineers recommend that turn signal lights be separate from and of a different color than brake lights. However, the present invention can be incorporated into present vehicle light systems in which the brake lights are also used as turn signal lights. This is accomplished by the provision of resistor 86, sensing transistor 92 and control transistor 70. The operation of these elements are as follows:

If the turn signal control 17 is actuated, the circuit to one of the lights 16 is opened by one of switches 19 so that one less light remains in the circuit and, therefore, the current passing through resistor 86 decreases with a consequent decrease in the small voltage drop across the resistor. This voltage decrease is sensed by transistor 92 and its output current is cut off. Thus, there is no voltage drop across resistor 74 and capacitor 98 discharges to ground potential. This cuts off the bias to the base of control transistor 70 which then becomes nonconductive and prevents transistor 76 from operating as described hereinabove. As a result, power transistor 84 remains conductive and the brake lights are illuminated with a steady light in the conventional manner while only the turn signal light flashes. In addition, it will be apparent that this same sensing system is operative to detect a burned-out brake light bulb and will indicate this to the driver by the absence of a flashing signal at the indicator light 91.

From the foregoing description of the preferred embodiment it will be readily apparent that numerous changes and modifications may be made in the details of the circuitry such that the invention is not intended to be limited other than as specifically set forth in the following claims.

What we claim is:

1. A vehicle warning light system for flashing at least one vehicle light on and off at different frequencies proportional to different rates of vehicle deceleration comprising in combination:

a. a brake operated switch,
   b. a multivibrator connected to and energized by closure of said brake operated switch, said multivibrator including a pair of transistors and a pair of impedance networks connected to said transistors for determining the time constants of said transistors,
   c. one of said pair of impedance networks including a series of impedances,
   d. deceleration responsive inertia switch means responsive to a plurality of individual, predetermined deceleration rates, said deceleration responsive inertia switch means being operatively connected to said series of impedances for progressively varying the total number of impedances in said series in response to said predetermined plurality of deceleration rates and thereby varying the time constant of the transistor controlled by said one impedance network,
   e. at least one vehicle warning light, and
   f. transistor switching circuit means connected to supply illuminating current to said warning light, and responsive to the output of aid multivibrator, for alternately illuminating and extinguishing said warning light at frequencies determined by said deceleration responsive inertia switch means and thereby flashing said warning light on and off at frequencies proportional to the predetermined rates of vehicle deceleration as sensed by said deceleration responsive inertia switch means.

2. The system as claimed in claim 1 wherein said deceleration responsive inertia switch means are operatively connected to progressively bypass impedances as said vehicle deceleration rate equals each of said predetermined deceleration rates.

3. The system as claimed in claim 1 wherein said transistor switching circuit means include a power transistor for conducting illuminating current to said warning light, and a driver transistor connected to said power transistor and responsive to the output of said multivibrator for rendering said power transistor conductive and nonconductive to the passage of illuminating current to said warning light at frequencies proportional to different rates of vehicle deceleration.

4. The system as claimed in claim 1 further including current sensing means connected to said vehicle warning light for sensing a decrease in the normal amount of current supplied thereto, and control circuit means responsive to said current sensing means for rendering said transistor switching circuit means continuously conductive.

5. A vehicle warning light system for flashing at least one vehicle light on and off at frequencies proportional to different rates of vehicle deceleration comprising:

a. a brake operated switch,
   b. a multivibrator connected to and energized by closure of said brake operated switch, said multivibrator including a pair of transistors and a pair of impedance networks connected to said transistors for determining the time constants of said transistors, one of said impedance networks being a fixed impedance network determining the fixed time constant of one of said transistors, the other of said impedance networks being a variable impedance network for determining the variable time constant of said other transistor, c. deceleration responsive circuit means responsive to a plurality of different deceleration rates, said deceleration responsive circuit means being operatively connected to vary the total amount of impedance of said variable impedance network in response to said different deceleration rates, d. at least one vehicle warning light, e. switching circuit means connected to supply illuminating current to said warning light, and f. circuit means connecting the output of said multivibrator to said switching means for alternately extinguishing said warning light for fixed duration periods determined by the time constant of said fixed impedance network, and illuminating said warning light for variable duration periods determined by the variable time constant of said variable impedance network as determined by said deceleration responsive circuit means.

6. The system as claimed in claim 5 wherein said deceleration responsive circuit means include inertia switch means responsive to a plurality of predetermined deceleration rates, and a series of impedances individually responsive to said inertia switch means for progressively varying the total number of impedances in said circuit in response to said predetermined plurality of deceleration rates.